United States Patent
Friedman

(10) Patent No.: US 10,297,130 B2
(45) Date of Patent: May 21, 2019

(54) SYSTEM FOR INDICATING THE PRESENCE OF A CHILD WITHIN A VEHICLE BY SENDING A SIGNAL TO A MOBILE DEVICE AFTER A PREDETERMINED AMOUNT OF TIME

(71) Applicant: Igor Friedman, Tampa, FL (US)

(72) Inventor: Igor Friedman, Tampa, FL (US)

( * ) Notice: Subject to any disclaimer, the term of this patent is extended or adjusted under 35 U.S.C. 154(b) by 0 days.

(21) Appl. No.: 15/332,506

(22) Filed: Oct. 24, 2016

(65) Prior Publication Data

US 2017/0116839 A1    Apr. 27, 2017

Related U.S. Application Data

(60) Provisional application No. 62/246,071, filed on Oct. 25, 2015.

(51) Int. Cl.
| G08B 21/00 | (2006.01) |
| G08B 21/02 | (2006.01) |
| B60N 2/00 | (2006.01) |
| B60N 2/26 | (2006.01) |
| B60N 2/28 | (2006.01) |

(52) U.S. Cl.
CPC ......... *G08B 21/0283* (2013.01); *B60N 2/002* (2013.01); *B60N 2/26* (2013.01); *B60N 2/28* (2013.01); *G08B 21/0269* (2013.01)

(58) Field of Classification Search
CPC . B60N 2/002; B60N 2/26; B60N 2/28; G08B 21/0269; G08B 21/0283
USPC ........................................................ 340/457
See application file for complete search history.

(56) References Cited

U.S. PATENT DOCUMENTS

| 9,227,484 | B1* | 1/2016 | Justice | B60N 2/002 |
| 2002/0145516 | A1* | 10/2002 | Moskowitz | B60H 1/00742 340/522 |
| 2004/0020314 | A1* | 2/2004 | Tsuchihashi | A61B 5/0507 73/865.9 |
| 2009/0237229 | A1* | 9/2009 | Kautz | B60N 2/002 340/457 |
| 2012/0232749 | A1* | 9/2012 | Schoenberg | B60N 2/002 701/36 |
| 2015/0123810 | A1* | 5/2015 | Hernandez-Rosas | H04W 4/70 340/870.02 |
| 2015/0165932 | A1* | 6/2015 | Maley | B60N 2/002 340/457 |
| 2016/0137102 | A1* | 5/2016 | Cuddihy | B60N 2/002 340/438 |

* cited by examiner

*Primary Examiner* — Mark S Rushing
(74) *Attorney, Agent, or Firm* — Bay State IP, LLC

(57) ABSTRACT

A device which detects a child presence in a car seat and communicates an audible and mobile-device reminder to the driver that a child occupant is in the seat is disclosed. The system utilizes internal sensors to monitor various vehicle occupancy conditions to determine when a triggering event has occurred while the car seat occupancy sensor is engaged. Once triggered, the system will immediately notify the driver that the child remains in the car seat inside the vehicle, and will also sent follow-up alerts.

16 Claims, 8 Drawing Sheets

FIG. 4 (example non-limiting implementations)

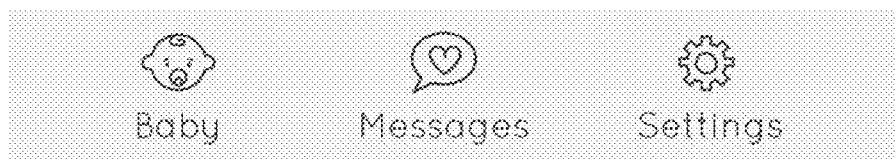
FIG. 6

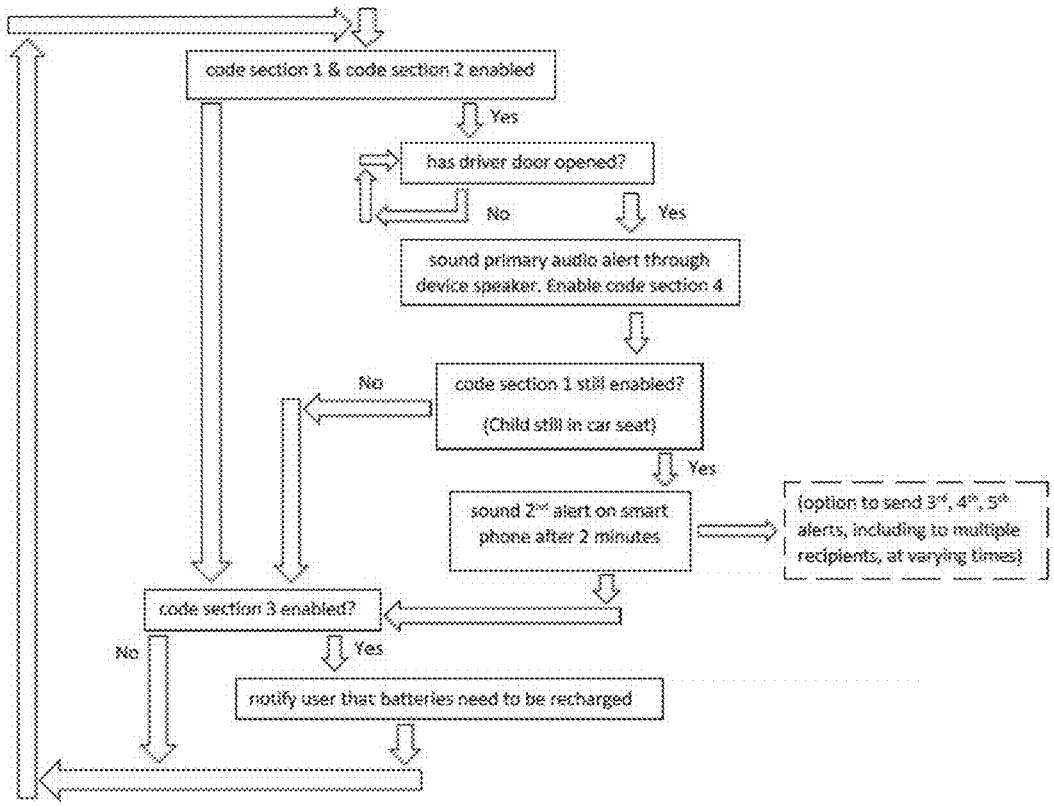
FIG. 8 (for examples only, not limiting, other embodiments can exist beyond what is shown in FIG. 8, deliberately simplified for purposes of clarity)

SYSTEM FOR INDICATING THE PRESENCE OF A CHILD WITHIN A VEHICLE BY SENDING A SIGNAL TO A MOBILE DEVICE AFTER A PREDETERMINED AMOUNT OF TIME

CROSS-REFERENCE TO RELATED APPLICATIONS

This application claims priority to U.S. Provisional Application No. 62/246,071, filed Oct. 25, 2015, the entire contents of which are incorporated by reference herein.

FIELD OF INVENTION

The subject invention relates to a vehicle child presence and reminder system based on internal sensors and data processing to determine triggering events.

BACKGROUND OF THE INVENTION

Although child car seats are becoming safer every year, another problem still exists that threatens the lives of children in vehicles. When faced with common daily distractions or when performing everyday routines, parents sometimes make unsafe decisions that can impact a child's safety. Upon arriving at a destination, a pre-occupied parent can forget a child who may be quietly sleeping out of sight in the backseat of a vehicle. Hyperthermia or heat related deaths are the third most frequent cause of non-traffic automotive child deaths.

Consequently, a mechanism for reminding individuals of the presence of a child occupant in a vehicle is desired.

BRIEF DESCRIPTION OF THE DRAWINGS

The features, advantages and details appear, by way of example, in the following detailed description of preferred embodiments.

FIGS. 5-7 show GUIs displayed on a mobile device;
and
FIG. 8 shows an example code-flow code-module diagram of activity within the embodiments of FIGS. 1-3.

DETAILED DESCRIPTION OF THE PREFERRED EMBODIMENTS

Figure 1:
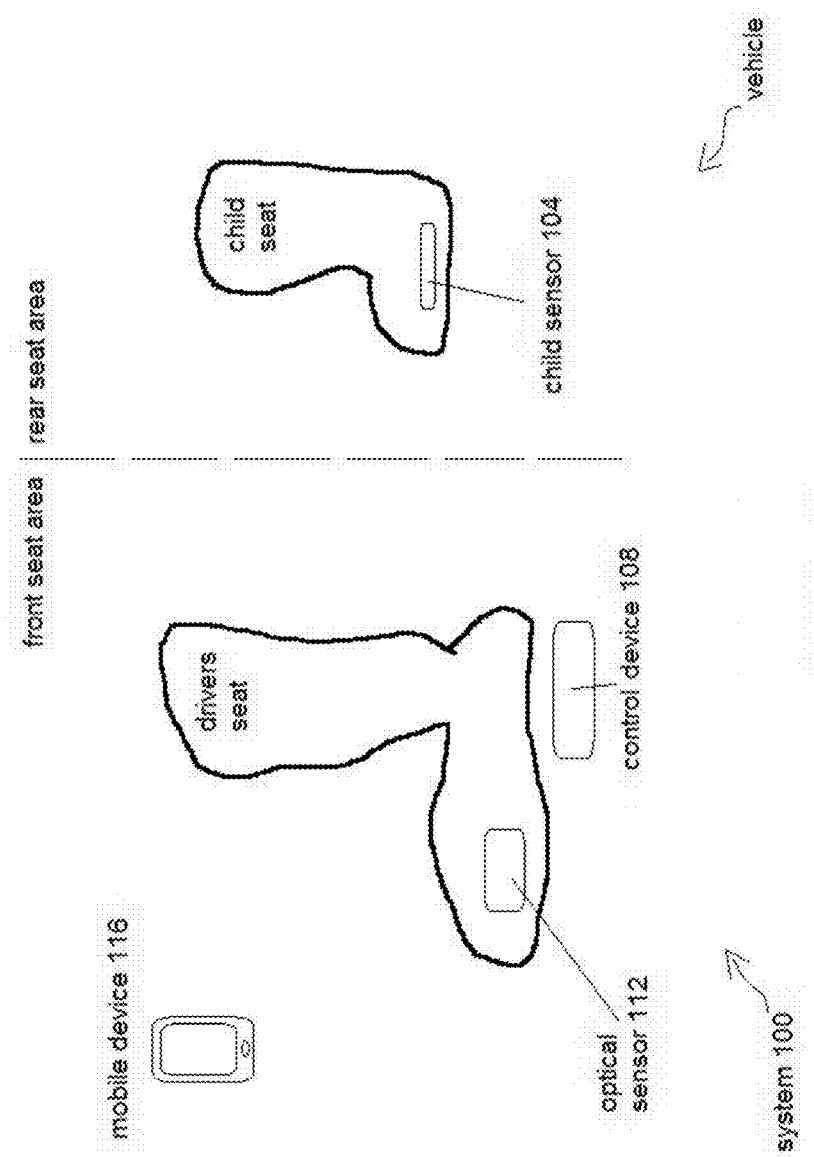
FIG. 1 shows an overview of an embodiment.

The embodiments herein comprise a system of three main parts, along with an installation procedure. FIG. 1 shows a system 100 comprising a child sensor 104, located underneath a child situated within a conventional car seat, a control device 108, and an optical sensor 112. The child sensor 104 communicates wirelessly with the control device 108 located under the driver's seat. The optical sensor 112 detects the driver's door opening and closing, is located on the side of the driver's seat. To prevent false alarms and reduce user-annoyance, a driver's seat pressure pad, face recognition sensor or other mechanism for detecting driver presence within the vehicle may also be implemented.

These three parts are installed by anyone who can understand how Velcro™ works. Mainly, a user will located the control device 108 for example under the driver's seat and turn it on. The user will also located the child sensor 104 within the existing child seat. The user will also attach the optical sensor 112 at the left hand side of the drivers seat, using e.g. Velcro™.

Within the embodiments disclosed herein, it is not necessary to purchase a specially-modified car seat. The embodiments proposed here are not limited to any one type of child seat design, but can be implemented to any car seat, including an infant carrier, a convertible toddler seat, a standard child car seat, or even a booster seat. However, an embodiment exists where the child sensor 104 is pre-packaged within a child seat.

The optical sensor 112 is connected to the control device 108. Once the driver-door is opened, if a child is still in the seat, the controller device sends a first audible alert as well as an alert to a proprietary mobile app (e.g. FIGS. 5-7) located within a user's mobile device 116 such as Android or iPhone (among other platforms). However, other notification mechanisms can also be employed, so that the system 100 can work effectively even for users who do not have any mobile device 116.

A user may ignore the first alert for several reasons, one being that they have not completely exited the vehicle, for example when the driver's door happens to be open. The driver may have temporarily stepped out of the vehicle just to pump gas, to load up the trunk, etc. However, a second visual and audible alert notification is sent to the mobile device 116, as well as the initial alert played through an audio speaker within the control device 108.

Figure 2:
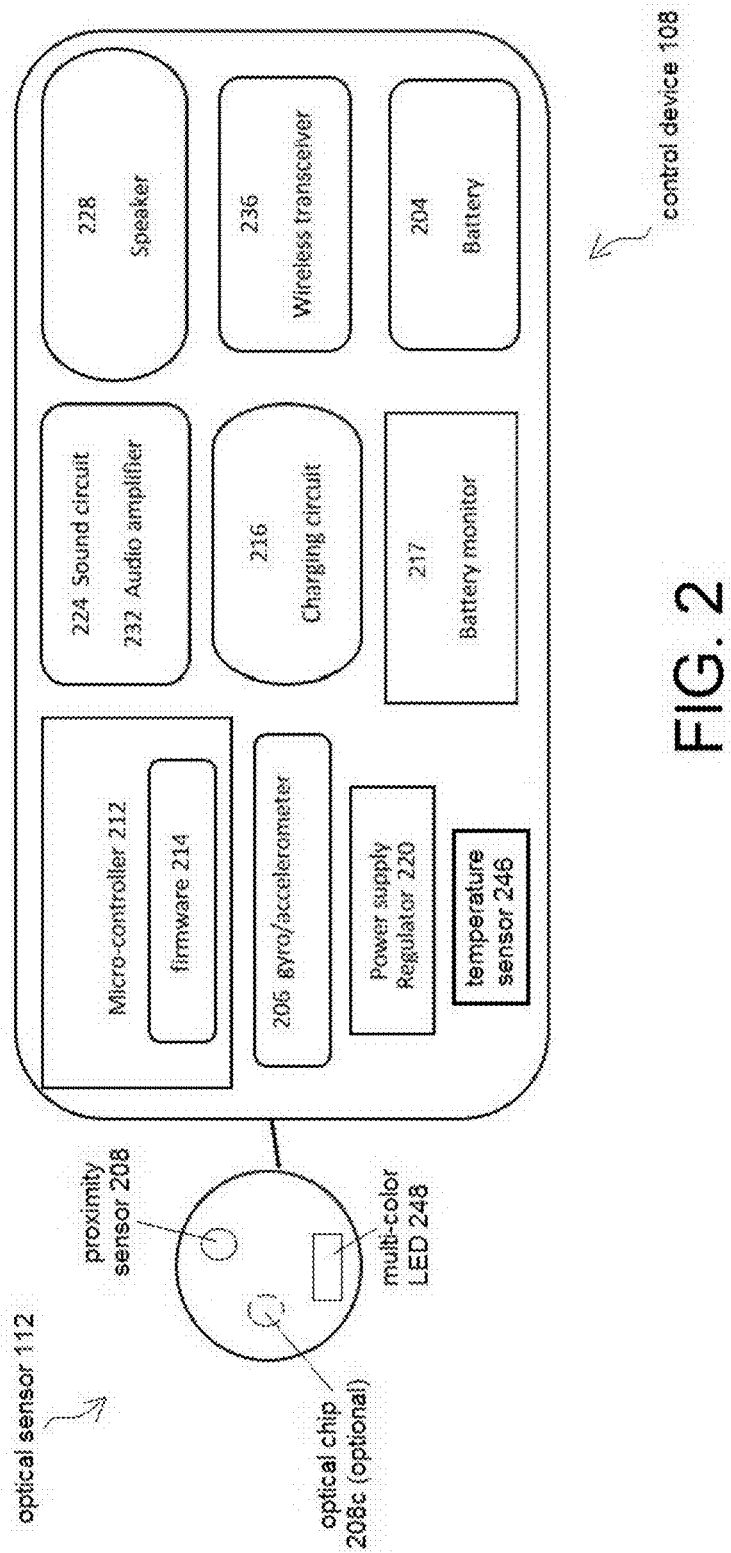
FIGS. 2 and 3 show details of the elements of FIG. 1.

FIG. 2 shows additional components of the control device 108 as well as the optical sensor 112, which is actually part of the control device 108 but is drawn separately in FIG. 1 because these two are located at differing places within the vehicle. From FIG. 2 it is apparent that the control device 108 further comprises a rechargeable battery 204, a microcontroller 212 interacting with updateable firmware 214, a battery charging circuit 216 and battery monitor 217, a voltage step-up power supply circuit 220, an audio sound module 224, a speaker 228, an audio amplifier 232, and a wireless RF module 236. Additionally, the optical sensor 112 comprises an optical proximity detector 208, and a multi-color LED 248.

The speaker 228 can broadcast an audible tone or voice-alert. The wireless module 236 may or may not use the Bluetooth® protocol. An optional blinking light is also contemplated for the system 100.

The optical proximity detector 208 detects whether the car door (drivers side only) is opened or closed. The system 100 further comprises a battery-alert monitor, and employs encryption to ensure that each copy of the system 100 sold does not accidentally trigger any other copies of the system 100, other than the intended one.

The system 100 employs logic executable by the control device 108, which among other things monitors child occupancy via, for example, the child sensor pressure pad 104. More information about this can be found in FIG. 8 and the descriptions thereof.

Figure 3:
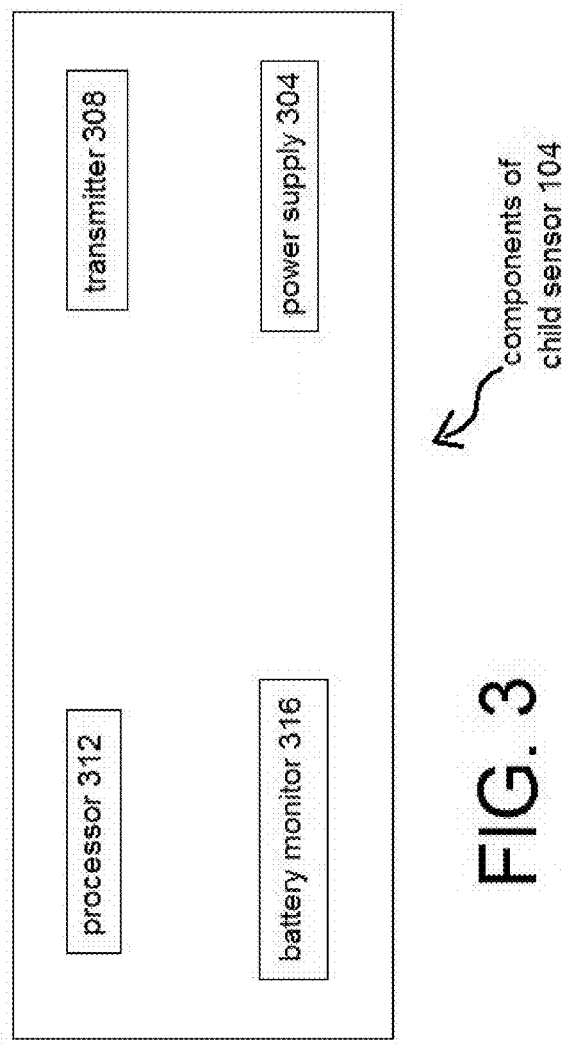

FIG. 3 shows additional detail about the child sensor pressure pad 104, including a voltage step-up power supply circuit 304, transmitter 308, processor 312, and battery monitor integrated circuit 316.

The child sensor 104 can be a pressure pad, although other implementations can also be used. The control device 108 continuously collects data from the child sensor 104 relating to child-occupancy, and the optical sensor 112 relating to the state of the driver side door. The collected data is constantly acted upon by a code driven algorithm contained within firmware 214 working with the microcontroller 212 that determines whether a triggering event has occurred. In response to determining a triggering event, the code driven algorithm (firmware 214) includes an alert generating function that triggers an alert component, such as the built-in loud speaker or a mobile phone app via Bluetooth communication, or other mechanisms as discussed below.

Details of Firmware 214

More information about the code-driven algorithms within the firmware 214 can be found in FIG. 8.

Sequence of Events within Microcontroller 212

The microcontroller 212 constantly polls the internal RF receiver and waits for data to be received from the child sensor pad 104 device. The initial transmitted RF data string from the child sensor device is a handshake signal. This initial string instructs the microcontroller 212 to sound an audible alert and blink a visual LED on the optical sensor 112 to notify the caretaker that the two devices are synced up properly. The firmware 214 then initiates a delay loop for a specified number of seconds to allow the caretaker to get into the vehicle so that the door trigger alert does not initiate the first time the door is opened.

The firmware 214 continuously polls the child seat sensor RF signal to check whether the child occupant is still in the car seat. The firmware 214 then continuously polls the optical sensor 112 to determine whether the driver side door is opened or closed. It also polls the battery charge state of the main device to determine whether the rechargeable battery is below a certain charge state. If the battery falls below the set limit, the firmware 214 instructs the red LED inside the optical sensor 112 to blink several times.

Once the optical sensor 112 reports that the driver's door has opened, the firmware 214 instructs the microcontroller 212 to send a trigger signal to the digital voice chip to verbally alert the caregiver that there's a child present in the car seat. It also sends an encoded Bluetooth message to a smart phone app to initiate a delay timer in the app to alert the caregiver after a preset time period from the initial trigger event, if the child still remains in the car seat. It also instructs the visual green LED in the optical sensor 112 to light up for several seconds for a visual alert.

As shown in FIG. 8, the cycle then repeats indefinitely until the child is removed from the car seat, which then deactivates the child sensor 104. The verbal audio alert from the control device 108 will stop sounding once the driver's door is closed, even if the child remains in the car seat. The alert to the mobile device 116 will however continue to indefinitely alert the driver or caregiver until the child is removed from the car seat.

Sequence of Events within Firmware 214

The firmware 214 initiates a sequence of events after the child sensor 104 is activated e.g. when a child is placed in the car seat. The firmware 214 blinks the built-in multicolor LED 248 to be green several times to indicate that device is working properly. The firmware 214 then continuously polls the battery charge state of the various batteries within the system 100 to trigger an alert event when the battery falls below a certain preset level. If the level is below the set limit, the red LED is blinked several times and the battery status is also transmitted to the control device 108 to notify the mobile device 116 through the proprietary app, and thus to alert the caregiver that the battery is running low and needs to be recharged soon. The firmware 214 then sends an encoded serial data string through the RF transmitter to the control device 108 to notify the microcontroller 212 that a child is still in the child seat.

The vehicle employing the system 100 may be any type of vehicle that can accommodate child seats and has a driver-side door. The system 100 may also send alerts from the vehicle's communication system, through digital satellite and/or cellular data, or other communication networking systems, e.g., to a wireless service provider, like a subscription-based service, such as OnStar®. In addition, communication components also include localized wireless communications, e.g., signal protocols such as RF telemetry data and Bluetooth® communications. The system 100 may thus be implemented without costly system or network infrastructure components. In all embodiments, no hard wiring to the vehicle's electrical system is required, although embodiments exist in which some connections may be made to the vehicle's diagnostic port.

The proximity detector 208 (within the optical sensor 112) tracks the opening and closing status of a door in the vehicle, and communicates this information to control device 108. This logic can be utilized to detect the event of a driver about to leave the vehicle. Other sensors within the system 100 may be employed. For example, a driver seat pressure sensor (not shown) can be used for preventing unnecessary alerts such as when the driver is clearly still within the vehicle. Also, a temperature sensor 246 (FIG. 2) can be used to collect cabin temperature data which will be communicated to the control device 108 and used by the logic to determine when to generate a critical temperature alert (see FIG. 5). Further, facial recognition detectors can be located in the dash and within the back-end of the front seat; first to make sure that the correct person and not an intruder is driving in the car, and second (potentially) to verify the identity of the child located within the child seat.

As stated, the system 100 includes one or more alert components for outputting an alert. The primary alert component is the digital audio sound module 224, which is a programmable audio device that's used to record a human voice or a digitally synthesized voice. Upon a triggering event, as determined by the control device 108, a trigger signal is then sent to the digital audio sound module 224 to activate the audio voice alert and enunciate it through the speaker 228.

The control device 108 monitors the occupancy sensor 104, which is installed or disposed in a child car seat as shown in FIG. 1, but also can be located within a seatbelt restraint system in a vehicle, for example, such as in a belt-clip type sensor. The child occupancy sensor 104 transmits a signal to the control device 108 when it becomes engaged or activated, as well as when it is disengaged, or deactivated.

Figure 4:
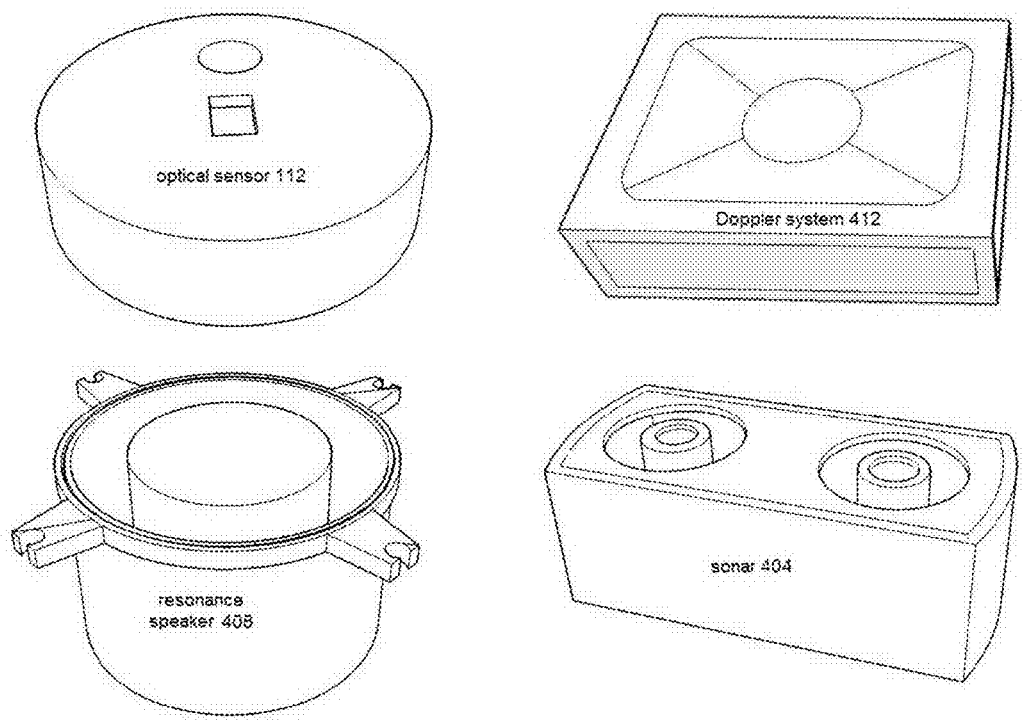
FIG. 4 shows additional embodiments.

FIG. 4 shows a variety of accessory add-on devices can be added to the control device 108 to potentially detect older kids in the vehicle that normally would not be seated on e.g. a pressure pad, as well as pets. One such device is a Doppler module 412 (see FIG. 4), a device which communicates any motion sensed inside the vehicle to a microcontroller in the control device 108. The firmware 214 can continuously poll a built-in gyro/accelerometer circuit 206, to determine whether the vehicle has stopped moving for a certain period of time. If stopped, then the Doppler device 412 gets polled for motion detection inside the vehicle's rear cabin to determine if a child or pet is still located inside the vehicle. When motion is detected, the firmware 214 sends an alert event to trigger the voice or tone generator circuit to sound an alert through a resonance speaker device 404, which will alert any bystanders or parents outside the vehicle that the child or pet is inside the vehicle. An alert is also sent to an app within the mobile device 116 to notify a nearby parent or caregiver.

Also as shown in FIG. 4, an optional accessory in the form of a sonar sensor 404 can also be added to alert the driver of a possible back-over of a bystander. This sonar backup obstacle sensor 404 communicates wirelessly with the controller device when the vehicle is placed in reverse gear. The power is activated to the sonar backup obstacle detector via, for example, the backup bulb circuit of a vehicle to which the sonar module is wired to. The firmware 214 continuously polls the signal from the wireless sonar module to determine if the sonar sensor 404 has turned on and whether it has detected an obstacle behind the vehicle. If an obstacle is detected, the microcontroller 212 triggers an alert and generates a series of tones or a vocal alert through the speaker in the control device 108 to notify the driver that an obstacle has been detected.

Turning now to packaging and manufacturing processes, the various enclosures for the elements of the system 100 can be manufactured out of various materials, including extruded aluminum, ABS plastic, thermoplastic made out of polycarbonate (PC) or acrylonitrile-butadiene-styrene, high impact-resistant polystyrene, injected silicone, or other materials. ABS plastic enclosures can be molded with top and bottom sections that fit together snugly, eliminating the need for screws. If needed, the top and bottom can be glued together for permanent closure. The color and texture of the plastic enclosures can be infused during the plastic injection molding process.

The rechargeable batteries utilized in the system 100 can be rechargeable, including Lithium Ion, Lithium polymer, nickel metal hydride, or other types.

The manufacturing method utilized in the production of the integrated circuit boards for the main controller and the child sensor devices can be any of various Printed Circuit Board (PCB) manufacturing processes, including but not limited to Computer Aided Manufacturing (CAM) for large scale fabrication line production.

Alternate Embodiments

In one alternative embodiment of the system 100, the complete functionality of the child sensor 104, including the microcontroller 212, various sensors, and batteries may be fully incorporated directly into a child car seat.

In another alternative embodiment of the system 100, the alert signal sent from the control device 108 can trigger one of several of the vehicle's existing devices, such as a horn, vehicle lights, or vehicle alarm system. This can be accomplished through a wireless device connected to the vehicle's diagnostic port and linked to the main controller device's Bluetooth transceiver. The main control device 108 can optionally be wired directly into a vehicle's Controller Area Network (CAN) bus network also. This could be used to alert any bystanders to the presence of a child left inside the vehicle. The CAN bus is a vehicle bus standard designed to allow microcontrollers and devices to communicate with each other in applications without a host computer. It is a message-based protocol, designed originally for multiplex electrical wiring within automobiles, but is also used in many other contexts.

The system 100 may be configured to monitor or perform self-diagnostic functions for diagnosing various conditions of the system 100, such as determining when the battery power inside the system 100 is running low. The alerts can be communicated to the driver through various LED lights (e.g. multi-color LED 248) on the system 100 and also to the proprietary app within the mobile device 116. The system 100 thus acquires and processes driver detection and child presence without costly system or wiring infrastructure components.

As shown in FIG. 4, the sonar sensor 404 based on sonar ping technology can be used to detect obstacles (such as individuals or pets) in the rear area of the vehicle. The sonar sensor 404 utilizes an ultrasonic transmitter transducer and an ultrasonic receiver. The sonar sensor 404 is integrated into the system 100 via a wireless RF link that transmits the telemetry data from the ultrasonic transducers to the control device 108, where the data is acted upon by the microcontroller 212 and processed by the firmware 214 to detect the distance to an object and determine whether to trigger an alert. The alert can be in the form of a voice alert, but also digital frequency tones. A visual alert can also be deployed. This can alert the driver to avoid any run over related injuries or fatalities. The sonar sensor 404 could for example attach to the rear vehicle bumper, either on top or below the bumper, and could be powered, for example, through the rear back-up light supply circuit and can be wired directly into the rear back-up lamp socket.

Connecting the sonar sensor 404 to a vehicle and to the system 100 could be achieved for example by professional installation, potentially using a pre-installed wiring harness connector (not shown), since the rear backup light cable is attached via a standard socket used within most vehicles. This connector would come with a Y type of cable (not shown), so a technician would not even need to cut any wires to install it.

Instead, such a technician would just need to open the lamp fixture assembly and connect the Y-type of cable to it, then connect the other end of the cable back to the main harness. It would still stay waterproof and no wires would be coming out from the lamp assembly. All connections would be made below the bumper.

Additionally, another audio device has also been developed to alert bystanders outside the vehicle. This is done by utilizing a full-range resonance speaker 408 (also shown in FIG. 4). The device works on the principle of tactile bass vibrations that resonate with the object they are attached to. The resonance speaker 408 attaches to any window surface of the vehicle using rubber suction cups or other attachment mechanism and creates a glass resonance speaker by resonating with the pane of glass to act as an audio transducer.

The resonance speaker 408 works with any window or mirror glass surface to allow sound waves to be passed through directly to the exterior of the vehicle. The volume of the audio alert can be increased by adjusting the power output of the amplifier that feeds the resonance speaker 408. Further, the resonance speaker 408 integrates into the control device 108 via a direct cable wire or through a wireless Bluetooth audio signal stream.

A variety of mechanisms can be used for the optical proximity detector 208. In an embodiment, the optical proximity detector 208 is an optical chip 208c (see FIG. 2) which combines proximity ranging and ambient light level measurement capabilities into a single package. Unlike simpler optical sensors that use the intensity of reflected light to detect objects, the optical chip 208c precisely measures duration of time for emitted pulses of infrared laser light to reach the nearest object and be reflected back to a detector, making it essentially an optical range sensor. This time-of-flight (TOF) measurement enables the optical chip 208c to accurately determine the absolute distance to a target with 1 mm resolution, without the object's reflectance influencing the measurement. The optical chip 208c is rated to perform ranging measurements of up to 10 cm (4"), but can also provide readings up to 20 cm (8") with its default settings. Furthermore, the optical chip 208c can be configured to measure ranges of up to 60 cm (24") at the cost of reduced resolution, although successful ranging at these longer distances will depend heavily on the target and environment. If advantageous for manufacturing process or parts-availability reasons, less complex infrared optical sensors may be used instead of the optical chip 208c to achieve the purpose of detecting the status of the driver side door being open or closed.

In an alternate embodiment, the system 100 can employ a microwave Doppler based sensor 412 (see FIG. 4) as an addition or a substitute to the child sensor 104, to determine for example whether a larger, non-car-seat-age child or pet has been left inside a vehicle. The Doppler sensor 412 employs a low energy microwave signal generator and a signal detection circuit to detect slight changes in motion based on the Doppler shift principle. The microwave signal can be in the 5 GHz or 10 GHz range band. The Doppler sensor 412 communicates the detected motion to the control device 108, which then determines whether to sound an alert to the caregiver based on several factors. For example, the control device 108 may trigger an alert immediately, or delay an alert, as selected by the user within the settings contained within the proprietary app on the mobile device 116 (see e.g. FIG. 6). There may be instances where an adult may intentionally wish to leave a child locked inside a vehicle, albeit for a short time. Indeed this happens every day without negative consequences.

This embodiment with the Doppler sensor 412 system enhances the capabilities of the system 100 to determine various occupant conditions inside the vehicle and allows detection of older kids or animals that are not restrained in a car safety seat or not situated on a pressure sensor pad. In this embodiment, the system 100 could also detect family pets stuck in a car, such as dogs and cats. Some pets like to sneak into a car, because it feels safe. The problem occurs when they cannot let themselves out.

Mobile Phone GUIs

Figure 5:
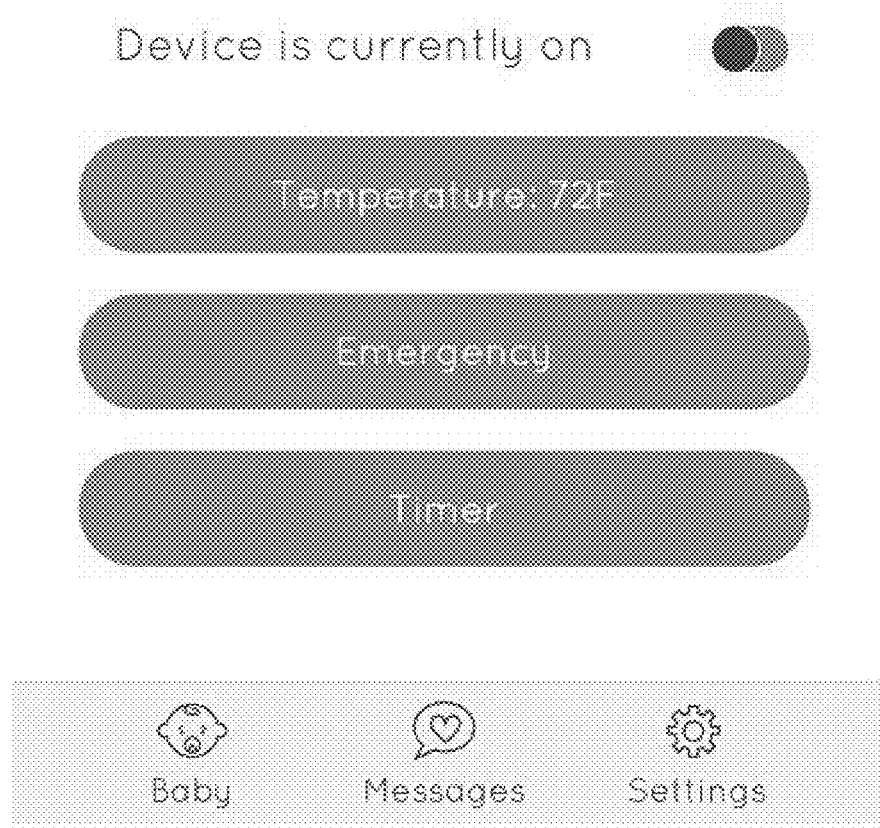
Figure 7:

FIGS. 5-7 show a screenshot example of GUIs (Graphical User Interface) to be displayed on the mobile device 116. FIG. 5 shows the potential configurability of the system 100, FIG. 6 shows an example alert, and FIG. 7 shows that the system 100 continues to function and is displayable even through the "lock" screen typically found within a mobile device 116.

The GUIs could also include, for example, an option on the main screen to pause the alert for stopping to fill up gas, e.g. 5 minutes. Further, the GUIs could also include, within the section labeled "settings" (FIG. 6), an option to take a photo of a child and make it a profile photo, an option to enter the child's name, an option to enter a secondary emergency contact for text alerts, an option to enter an emergency service contact in case the secondary contact does not answer.

Also, one or more of the GUIs could include an option to select whether the audio alert goes to the device speaker, or the resonance speaker on the glass of the vehicle, or both.

The proprietary app GUI (e.g. FIG. 5) may also include an option for a driver to poll the microwave Doppler sensor 412 inside the vehicle to see if there is anyone inside.

Another configuration option exists to extend the delay time, from 1 minute to e.g. 5 minutes. The volume can also be changed for the second alert since it sounds on the mobile device 116, and not necessarily on the control device 108.

A third alert option also exists, as long as it's possible to use the same type of text alert as the second alert option (in other words, as long as the mobile device 116 supports this feature). There is no limit on how many alert recipients the system 100 can send to because this requires only a minor setting within the software running on the proprietary app running on the mobile device 216. A user could have an option of adding up to, for example 10 alert recipients.

The proprietary app on the mobile device 116 can also be utilized as a locator beacon. By using the built-in GPS location feature found in most modern day mobile devices 116, the proprietary app can alert a secondary care provider or emergency services with GPS coordinates of the vehicle location after the child alert device gets triggered. The coordinate information can be sent through a text message or directly through app to app push notifications. This useful feature can allow loved ones or emergency services to quickly locate the vehicle where the child is located, in case the primary care provider does not respond to the device alerts. The feature can also be integrated with existing emergency location services such as the OnStar service.

Additional Embodiments

A: Integration into Child Car Seats

The system 100 can be easily integrated into production child car seats. The electronic components within the child sensor 104 can be readily installed into a production child safety seat via a molded compartment within the seat. For example, a pressure sensor pad can be integrated into the seat, just below the padding where the child would sit. The multi-color status LED 248 could, for example, protrude through the plastic molding of the seat to provide a visual indication of device functions to the parent or caregiver. Such a seat sensor would still communicate with the control device 108 via wireless communication. In this embodiment, the control device 108 will still reside elsewhere inside the vehicle as in the stand-alone version, and will continue to poll the integrated child seat sensor and manage the control functions associated with all sensor inputs, including the optical (door) sensor 112. The control device 108 will still handle all alert notifications, including the alert signals sent to the mobile device 116.

B: Integration into Automotive Production Vehicles

The system 100 technology can also be integrated into automotive production vehicles. The control device 108 and the child sensor 104 can be configured to communicate with the automotive Controller Area Network (CAN) bus standard, as an electronic control unit (ECU), through a standard node or gateway node to connect as an independent subsystem. The system 100 can also integrate into a vehicle as standalone firmware code to an existing electronic control unit (ECU) already built into a vehicle. As stated, the CAN bus is a vehicle bus standard designed to allow microcontrollers and devices to communicate with each other in applications without a host computer. It is a message-based protocol, designed originally for multiplex electrical wiring within automobiles, but is also used in many other contexts.

The production vehicle's existing sensors can be utilized by the system 100 to poll information from various sensors inside the vehicle to collect data and act upon it. As an example, either in conjunction with or in replacement for the optical sensor 112, the driver's side door plunger switch can be polled by the system 100 to determine when the driver is about to exit the vehicle. The built-in seat pressure sensors that are polled for airbag deployment purposes can also be utilized by the system 100 to determine whether an occupant resides in an automotive seat. Seatbelt sensors also can be polled through the CAN bus to allow detection of certain occupant situations. The vehicle's various alert devices can also be triggered by the system 100 through the CAN bus to alert the driver or caregiver of the presence of a child in the automobile, such as the vehicle's alarm or horn system. Automotive lights and dash panel alerts can also be activated to broadcast an alert of a child in a car seat. The vehicle's seatbelt sensor system can allow for the integration of a pressure sensor from the child's car seat to link into the CAM bus also.

C: Assault-Prevention

The Doppler motion detection sensor 412 may also be utilized in the system 100 as a security warning notifier by allowing the driver to activate it remotely through the Smart phone app and get a response back to check whether an unauthorized person is hiding inside the vehicle.

Disclaimers\Non-Limitations

Any methods disclosed herein comprise one or more steps or actions for performing the described method. The method steps and/or actions can be interchanged with one another. In other words, unless a specific order of steps or actions is required for proper operation of the embodiment, the order and/or use of specific steps and/or actions can be modified.

In the above description of embodiments, various features are sometimes grouped together in a single embodiment, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

While specific embodiments and applications of the present invention have been illustrated and described, it is to be understood that the invention is not limited to the precise configuration and components disclosed herein. Various modifications, changes, and variations which will be apparent to those skilled in the art are made in the arrangement, operation, and details of the methods and systems of the present invention disclosed herein without departing from the spirit and scope of the invention.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system for indicating child presence within a vehicle, comprising:
   a stand-alone control device;
   a pressure pad located in a child seat for detecting whether a child is occupying the child seat within the vehicle, wherein the pressure pad is in communication with the control device; and
   an optical sensor comprising a means of detecting whether a car door is open or closed, wherein the optical sensor communicates with the control device to determine whether a driver side door is open or closed;
   a microcontroller within the control device comprising firmware that continuously polls the optical sensor and the pressure pad, wherein the firmware instructs the microcontroller to alert a user when the optical sensor indicates that the driver side door is open and the pressure pad detects that the child seat is occupied;
   wherein when the driver side door is open and the pressure pad detects the presence of a child in the child seat, the control device sends a first audible warning alert and, after a predetermined time period, additional warning alerts are sent to a proprietary app within a mobile device; and
   wherein the first audible warning alert from the control device stops sounding once the driver's door is closed, and the alert to the mobile device continues until the child is removed from the car seat.

2. The system of claim 1, wherein the pressure pad is manufactured directly within the child seat.

3. The system of claim 1, wherein the pressure pad further comprises:
   a Doppler-based microwave motion sensor for detecting movement inside the vehicle made by a child, pet, or other occupant.

4. The system of claim 1, wherein the pressure pad further comprises:
   a plurality of facial recognition sensors, wherein the facial recognition sensors recognize numerous occupants.

5. The system of claim 1, wherein the control device further comprises:
   an output device further comprising a means of sending the first audible warning, wherein the output device further comprises an alert sent through a digital audio circuit, wherein the digital audio circuit is connected to an audio amplifier through a speaker within the control device; and
   wherein the control device is not connected to any electrical components of the vehicle.

6. The system of claim 1, wherein the output device further comprises:
   a mobile computing device.

7. A child presence detection and alert system integrated into a vehicle, comprising:
   a stand-alone, battery powered control device, further comprising a microcontroller and updatable firmware;
   a battery powered child sensor pressure pad located in a car seat further comprising a means of detecting whether a child is occupying the car seat within the vehicle, wherein the child sensor pressure pad is in communication with the control device; and
   an optical sensor in communication with the control device, wherein the optical sensor determines whether a driver's door is open or closed, wherein the control device sends a first audible warning alert when the driver's side door is open and the child sensor pressure pad detects the presence of a child, and, wherein the control device sends additional audible warning alerts after a specified period of time to a proprietary app within a mobile device wherein the control device and child sensor pressure pad communicate and interface with an automotive Controller Area Network (CAN) bus standard as an electronic control unit (ECU) through a standard node or gateway noted to connect as an independent subsystem;

wherein the child presence detection and alert system integrates into the vehicle as standalone firmware code for an existing electronic control unit (ECU) already built into the vehicle to utilize the vehicle's various existing sensor and alert devices; and wherein the first audible warning alert from the control device stops sounding once the driver's door is closed, and the additional audible warning alerts to the mobile device continue until the child is removed from the car seat.

8. The system of claim 7, wherein the output device further comprises:

a vehicle horn and alarm system.

9. The system of claim 7, wherein the output device further comprises:

a vehicle's lights.

10. The system of claim 7, wherein the output device further comprises:

the vehicle's existing wireless communication networks.

11. The system of claim 1, further comprising:

the proprietary app facilitating two way wireless communication between the mobile device and the controller device for receiving trigger alert messages for the child sensor device and to allow for configurability of the system from the app itself.

12. The system of claim 11, further comprising:

an option within a GUI located inside the proprietary app which allows selection of pausing an alert for a predetermined period of time.

13. The system of claim 11, further comprising:

the proprietary app having a plurality of configuration option GUIs comprising an option to take a photo of a child and make it a profile photo, an option to enter the child's name, an option to enter a secondary emergency contact for text alerts, and an option to enter an emergency service contact in case the secondary contact does not answer.

14. The system of claim 11, further comprising:

an option within a GUI located inside the proprietary app allowing a driver to poll a microwave motion sensor inside the vehicle to see if there is a possible intruder concealed therein.

15. The system of claim 11, further comprising:

an option within a GUI located inside the proprietary app to provide a visual alert regarding the current state of battery levels of both the control device and the child sensor pressure pad.

16. The system of claim 11, further comprising:

the proprietary app having an in-app device locator beacon utilizing a GPS location feature within the mobile device hardware;

wherein when a child alert is triggered, the device locator beacon is configured to alert a secondary care provider or emergency services provider with GPS coordinates of the vehicle location;

further wherein the GPS coordinate information can be sent through a text message or directly through app to app push notifications.

* * * * *